United States Patent [19]
Sakaguchi et al.

[11] 3,796,483
[45] Mar. 12, 1974

[54] FILM FOOTAGE INDICATOR DEVICE

[75] Inventors: Keiichi Sakaguchi; Noritsugu Hirata, both of Yokohama, Japan

[73] Assignee: Canon Kabushiki Kaisha, Tokyo, Japan

[22] Filed: Feb. 22, 1973

[21] Appl. No.: 334,899

[30] Foreign Application Priority Data
Feb. 28, 1972 Japan.............................. 47-24260

[52] U.S. Cl.................................. 352/172, 352/72
[51] Int. Cl. ............................................ G03b 1/60
[58] Field of Search .............. 352/170, 171, 172, 72

[56] References Cited
UNITED STATES PATENTS

| | | | |
|---|---|---|---|
| 3,620,610 | 11/1971 | Carlson.............................. | 352/172 |
| 3,297,397 | 1/1967 | Grant.................................. | 352/172 |
| 3,650,611 | 3/1972 | Carlson.............................. | 352/172 |
| 3,578,856 | 5/1971 | Thate................................. | 352/172 |

*Primary Examiner*—Monroe H. Hayes
*Attorney, Agent, or Firm*—William R. Woodward; Flynn & Frishauf

[57] ABSTRACT

A film footage indicator device for cinecameras capable of indicating consumption of as little as 10 or 20 frames includes first power transmission means deceleratedly driven from a drive source, second power transmission means engageable with said first transmission means and movable axially thereof, a guide member formed with a helical groove and coupled integrally to said second transmission means, resilient means normally biasing the guide member and the second transmission means toward their start position for axial movement, and an engaging member engageable with the guide member upon insertion of a film cassette into the camera and disengageable therefrom upon removal of the cassette from the camera, thereby indicating an amount of film consumption in accordance with the axial and rotary movements of the second transmission means.

11 Claims, 13 Drawing Figures

PATENTED MAR 12 1974
3,796,483
SHEET 1 OF 4
FIG. 1
FIG. 2
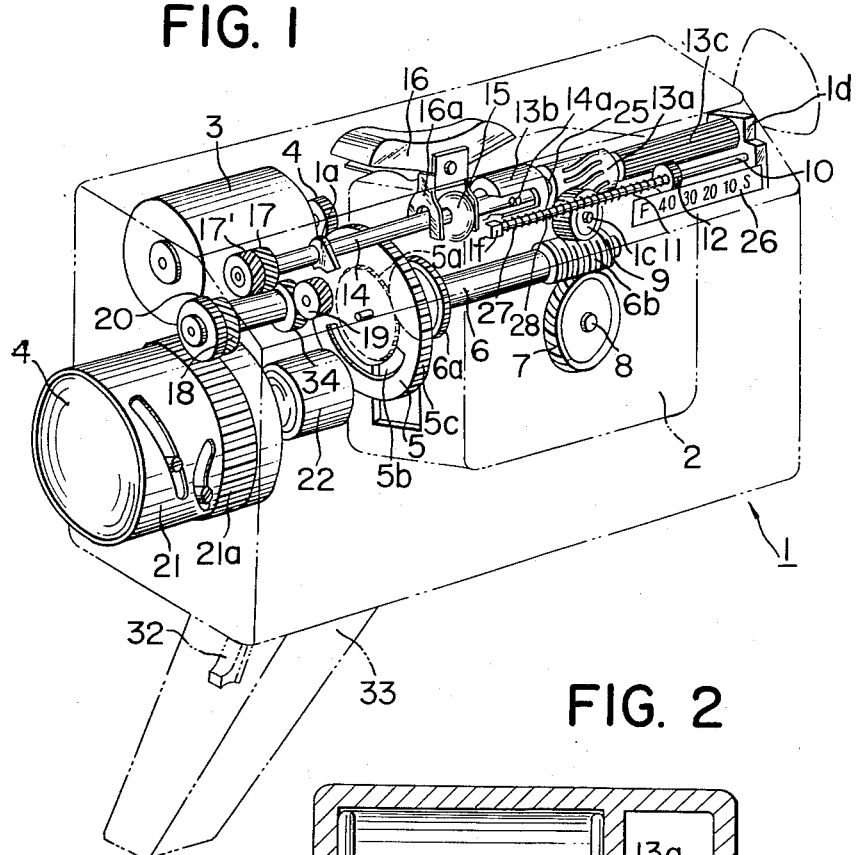
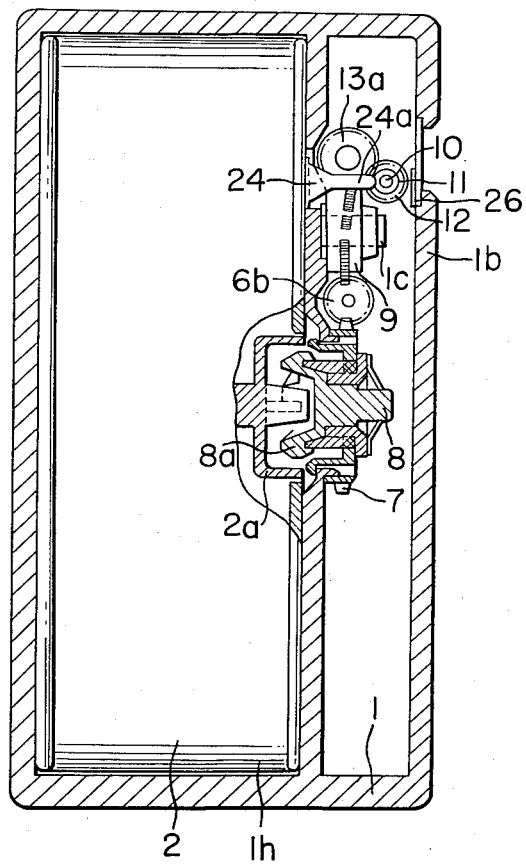

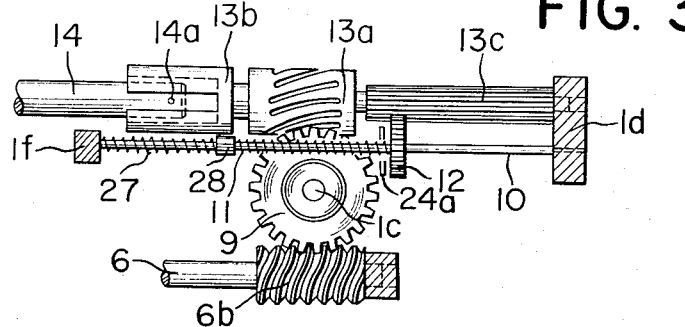
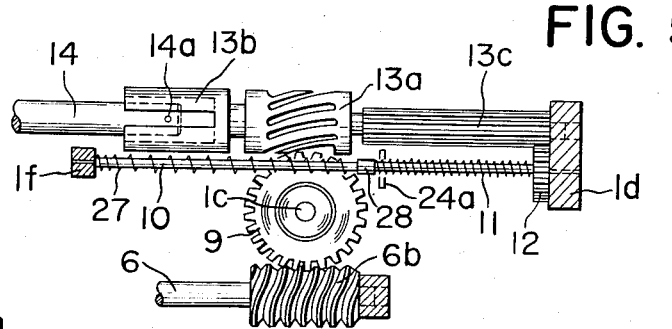
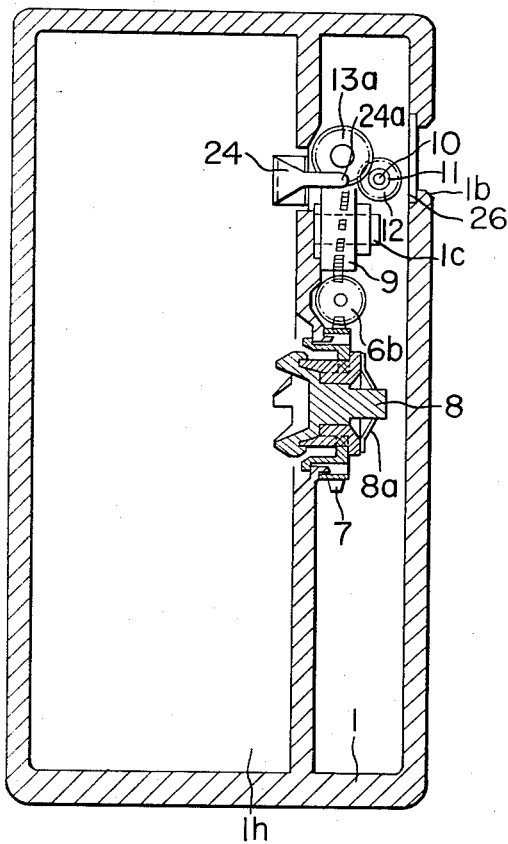
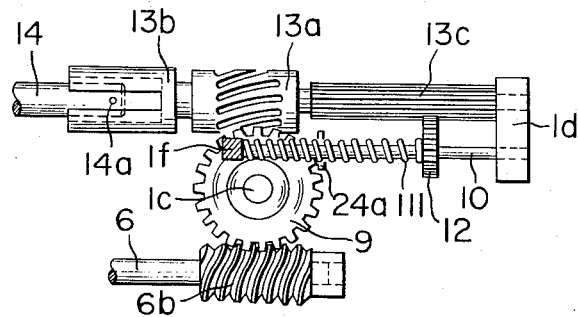
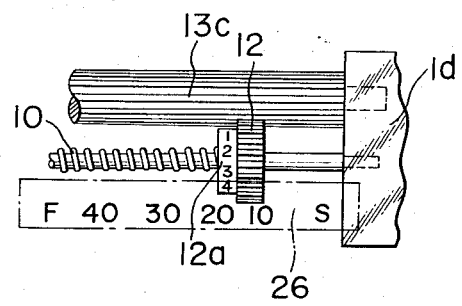

PATENTED MAR 12 1974 3,796,483

FILM FOOTAGE INDICATOR DEVICE

BACKGROUND OF THE INVENTION

1. Field of the Invention

This invention relates to improvements in a film footage indicator device for cinecameras.

2. Description of the Prior Art

Known film footage indicator devices for cinecameras are shown in U.S. Pat. No. 3,578,856. Briefly, the device disclosed by this patent comprises a guide member formed with a helically threaded groove for drivingly guiding the guide member in accordance with the amount of film exposed, a drive source capable of effecting film advance together with the guide member, a spring for returning a pointer needle to its start position upon removal of a film cassette from the camera, and a scale for enabling the amount of film exposed to be read out according to the position of the pointer needle.

The length of the scale from its start or zero position to its final position representing the total amount of film consumption is so much limited because of its construction that a minor amount of consumed film, say, up to 10 or 20 frames, cannot be indicated by such conventional devices.

SUMMARY OF THE INVENTION

It is an object of the present invention to provide a film footage indicator device for cinecameras which is reliable to operate and economical to manufacture.

It is another object of the present invention to enable even a smaller number of exposed frames (say, 10 or 20 frames) to be indicated.

It is still another object of the present invention to provide an easily readable scale for indicating the amount of film consumed.

BRIEF DESCRIPTION OF THE DRAWINGS

The invention will become fully apparent from the following detailed description thereof taken in conjunction with the accompanying drawings, in which:

FIG. 1 is a perspective view showing the construction of the film footage indicator device for a cinecamera according to an embodiment of the present invention;

FIG. 2 is a cross-sectional view of a portion of FIG. 1 and showing second power transmission means in a position for indicating an amount of film consumption with a film cassette positioned within the camera housing;

FIG. 3 is a fragmentary plan view corresponding to FIG. 2;

FIG. 4 is a cross-sectional view similar to FIG. 2 but showing the second power transmission means in its start position with the film cassette removed from the camera housing;

FIG. 5 is a fragmentary plan view corresponding to FIG. 4;

FIG. 6 shows a modified embodiment of the present invention;

FIG. 7 is an enlarged detail illustrating the means for indicating the amount of film consumption according to the present invention;

DESCRIPTION OF THE PREFERRED EMBODIMENTS

Figure 8:
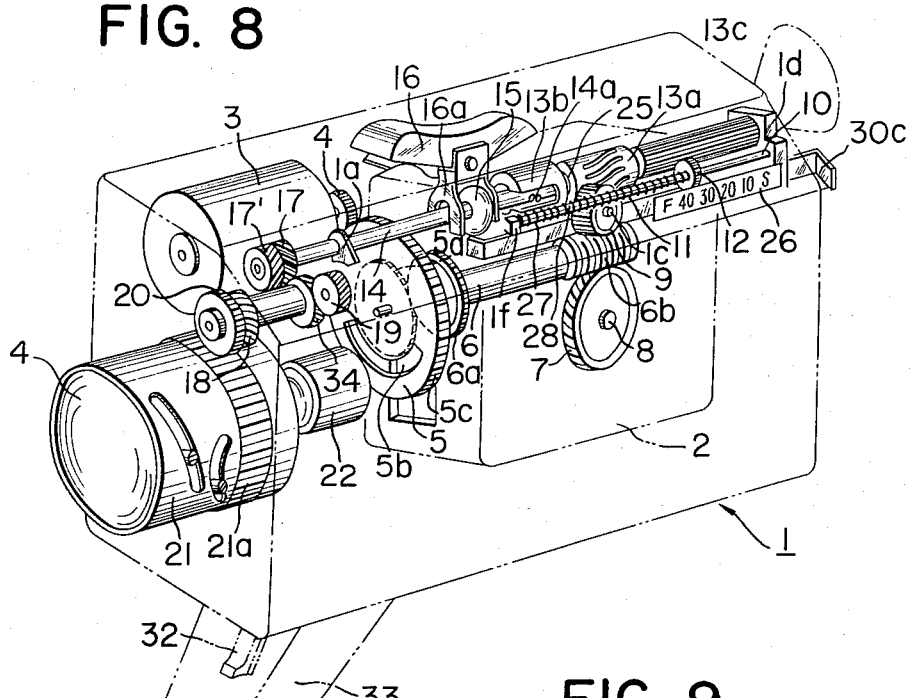
FIG. 8 is a perspective view showing the construction of the indicator device according to a further embodiment of the present invention.
Figure 9:
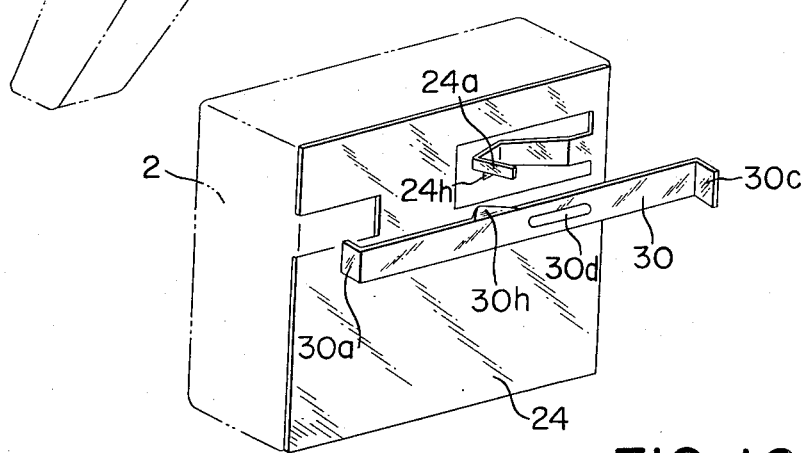
FIG. 9 is an enlarged, fragmentary, perspective view showing the means in the embodiment of FIG. 8 used to disengage a resilient member from a guide member when the film cassette is removed from the camera housing.
Figure 10:
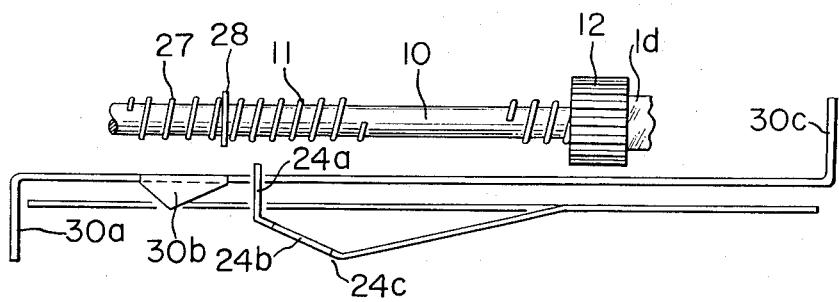
FIG. 10 is a fragmentary plan view of the FIG. 8 embodiment showing the second power transmission means in its start position after the film cassette has been removed from the cassette containing chamber within the camera housing.

Referring to the embodiment of the present invention shown in FIGS. 1 to 5, in FIG. 1 a film footage indicator device is shown with a camera housing 1 removed to show the arrangement of main elements constituting such device. The main elements include first power transmission means in the form of an elongated rotary shaft 13 deceleratedly driven from a power source 3, second power transmission means in the form of a pinion 12 engaged with the rotary shaft 13 and axially movable, a screw-like guide member 11 integrally connected to the pinion 12, resilient means in the form of a coil spring 27 normally biasing the guide member 11 and the pinion 12 into their start position for axial movement, and engaging means in the form of an engaging member 24 adapted to engage the guide member 11 when a film cassette 2 is inserted into the camera housing 1 and to disengage therefrom when the film cassette is removed. The camera housing 1 defines a chamber 1h for containing therein a film cassette 2 and has a grip member 33 integrally secured thereto. The grip member 33 is provided with a switch 32 controlling the power source 3.

A cam ring 21 comprising a spur gear 21a and camming grooves 21b and 21c has a magnification system held therewithin and is disposed forwardly of an image forming system 22, which is followed by a shutter blade 5 and a film cassette 2 successively.

A small spur gear 4 is mounted on the output shaft of the power source 3 with a predetermined slit torque provided therebetween, so as to transmit the rotary power of the power source to the shutter blade 5 to rotate the latter.

The shutter blade 5 has an opening 5b for passing therethrough picture-taking light passed through said magnification system and image forming system, and includes a large input spur gear portion 5c meshing with the small spur gear 4 and an output pinion portion 5a concentric with the large input spur gear portion 5c. The shutter blade is mounted on a shaft 29 rotatably journalled to the camera housing 1.

A drive shaft 6 is provided with an input spur gear portion 6a meshing with the output pinion portion 5a of the shutter blade 5 to receive the rotary power from the power source 3, and also provided with an output worm gear portion 6b meshing with a skew gear 7 and an idle gear 9 to further transmit the rotary power from the power source to the gears 7 and 9.

The skew gear 7 is rotatably journalled to the camera housing 1 and as shown in FIG. 2, it rotatably supports therein a pawl member 8 which is engaged with a film take-up engaging portion 2a contained within the film cassette 2, with a predetermined slip torque provided therebetween, thereby driving the film take-up engaging portion 2a.

The idle gear 9 is rotatably mounted on a shaft 1c provided on the camera housing 1 in opposed relationship with the skew gear 7 and the drive shaft 6, and has a helically toothed portion which serves as an output worm gear utilizing the input from the teeth of an input skew gear 9a meshing with the worm gear portion 6b of the drive shaft 6.

The elongated rotary shaft 13 forming the first power transmission means in the film footage indicator device is formed with a gear portion such as skew gear 13a meshing with the worm gear portion of the idle gear 9 to receive the rotary power from the power source 3. The rotary shaft 13 is also formed with a gear portion in the form of an elongated small spur gear 13c. These two gear portions 13a and 13c of the rotary shaft 13 are coaxial with each other and connected together for rotation at an equal angular velocity. The rotary shaft 13 is rotatably journalled to a bearing portion 1d and a bearing member 25 both provided in the camera housing 1.

The pinion 12 is mounted on a shaft 10 journalled to the bearing portions 1f and 1d of the camera housing 1, for meshing with the small spur gear 13c and for axial sliding movement, and it serves to indicate the amount of film consumed.

The screw-like guide member 11 is rotatable with the pinion 12 about the shaft 10 and slidable axially thereof, and has a coil spring or the like wound along a helical groove formed on the surface thereof. The coil spring 27 has one end thereof engaged with the corresponding end face of the screw-like guide member 11 with a spacer 28 interposed, and the other end engaged with the bearing portion 1f of the camera housing 1, thereby biasing the pinion 12 and guide member 11 toward their start position.

The engaging member 24 has an engaging end portion 24a which is engageable with the helical groove on the screw-like guide member 11 when the film cassette 2 is inserted into the film cassette containing chamber 1h within the camera housing 1, and disengageable therefrom when the cassette 2 is removed from the chamber 1h. The engaging member 24 is self-biased out of such engagement by its own resiliency.

Figure 13:
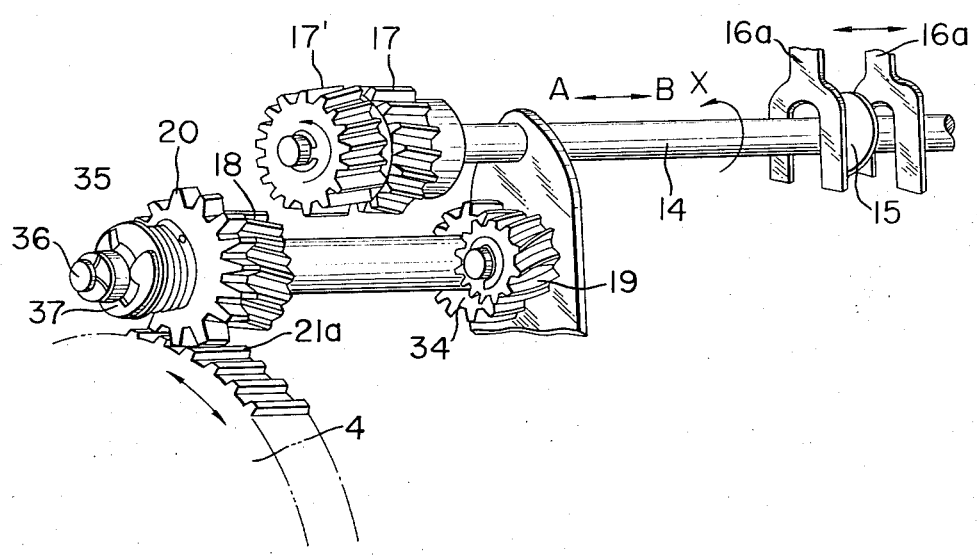
FIG. 13 is a perspective view showing the essential part of the zoom lens driving gearing arrangement commonly used in the embodiments of FIGS. 1 and 8.

The device of the present invention further includes an actuator rod 14 having drive gears 17 and 17' securely mounted on one end thereof, driven gears 18 and 34 formed integrally with each other, and a zoom drive gear 20 resiliently supported by a friction spring 35 for frictional rotation between a clamp washer 37 on a support shaft 36 studded in the housing and the driven gear 18 (FIG. 13). The zoom drive gear 20 is always in mesh engagement with the toothed portion 21a on the zoom ring for holding the zoom lens 4. An intermediate gear 19 is always in mesh engagement with the driven gear 34 so as to be driven thereby. When a zoom operating button 16 is depressed to move the actuator rod 14 in the direction of arrow A as indicated in FIG. 13, the drive gear 17' may be engaged only with the driven gear 18. When the actuator rod 14 is moved in the direction of arrow B, the drive gear 17 may be engaged only with the intermediate gear 19. The drive gear 17' is formed as a skew gear having its teeth skewed in the direction of rotation X of the actuator rod 14, while the drive gear 17 is formed as a skew gear having its teeth skewed in the direction opposite to the direction of rotation X. The driven gear 18 and intermediate gear 19 are formed as skew gears having their teeth skewed in the directions opposite to the skewed teeth of the drive gears 17' and 17 so as to mesh therewith, respectively. Therefore, the pitch between the opposed tooth crests of the drive gear 17' and driven gear 18 is increased with the angle of skew of the teeth of these gears, thus ensuring a relatively smooth mesh engagement between the two gears 17' and 18. This relation also holds true of the drive gear 17 and intermediate gear 19.

In the above-described construction, the film cassette 2 when inserted into the chamber 1h within the camera housing 1 causes the engaging member 24 to engage the screw-like guide member 11, so that the guide member 11 and the pinion 12 are deceleratedly driven to rotate by the drive source 3 and also slide axially with the aid of the helical groove on the guide member 11 against the force of the coil spring 27 thereon in accordance with the amount of film consumed. The axial displacement of the pinion 12 is indicated by a scale 26 provided in a window formed in the camera housing 1, thus enabling the amount of film consumed to be confirmed.

When the film cassette 2 is removed from the chamber 1h, the engaging end portion 24a of the engaging member 24 is disengaged from the guide member 11 to permit the guide member 11 and pinion 12 to be returned to their start position by the coil spring 27.

FIG. 6 shows a modification of the above-described embodiment in which the coil spring 27 for returning the pinion to its start position after the disengagement between the engaging member 24 and the guide member 11 is replaced by an axially resilient helical coil spring serving as guide member 111 for axially moving the pinion 12. The guide member 111 in the form of a coil spring has its opposite ends in resilient engagement with the bearing portion 1f and the pinion 12 and is rotatable about the shaft 10.

The other parts of this modified embodiment are identical in construction and operation with those of the above-described embodiment. When the film cassette 2 is inserted into the cassette containing chamber 1h within the camera housing 1h, the engaging member 24 is caused to engage the helical groove of the guide member 111 by the cassette 2, in the same manner as described previously. In this position, the pinion 12 is deceleratedly driven to rotate by the drive source 3 to thereby rotate the coil spring or guide member 111 in a twisted manner. This angular rotation of the guide member causes the coil spring to be compressed or tensioned with the engaging member 24 as the guide, in accordance with the direction of the turn of the coil, so that the pinion 12 is caused to slide axially in accordance with the amount of film consumed. Such axial displacement of the pinion 12 is indicated by the scale 26 in the window formed in the camera housing 1, thereby enabling the amount of film consumed to be confirmed.

When the film cassette 2 is removed from the cassette containing chamber 1h, the engaging end portion 24a of the engaging member 24 is disengaged to permit the pinion 12 to be returned to its start position by the resiliency of the guide member 111.

The pitch of the teeth on the pinion 12 is selected such as to be in accord with a specific number of film frames (say, 10 or 20 frames), and the revolution of the teeth can be seen externally of the camera with the aid of the scale 26. Thus, the present invention simply solves the problem often experienced with the prior art that some minor number of frames (such as 10 or 20 frames) could not be indicated. As shown in FIG. 7, numerals or indicia representing a predetermined number of film frames may be provided around a cylindrical portion 12a formed integrally with the pinion 12 to enhance the effect of visual indication.

Further, the pinion 12 may advantageously be formed of a synthetic resin material of bright color or a metal or like material of high luster to make the pinion more readily visible from outside of the camera.

FIGS. 8 to 12 show a further improved embodiment of the present invention in which the pinion 12 for indicating the amount of film consumption may be returned to its start position by operating a lever 30 for removing the cassette 2 from the chamber 1h within the camera housing 1.

Figure 11:
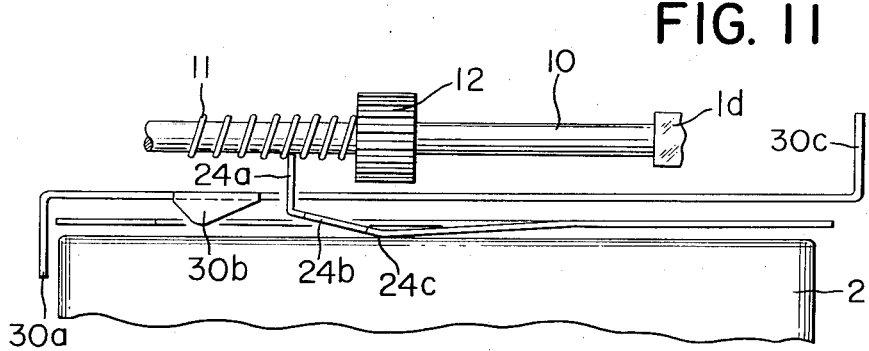
FIG. 11 is a fragmentary plan view showing the said second power transmission means in a position for indicating an amount of film consumption with the film cassette positioned in the cassette containing chamber within the camera housing.
Figure 12:
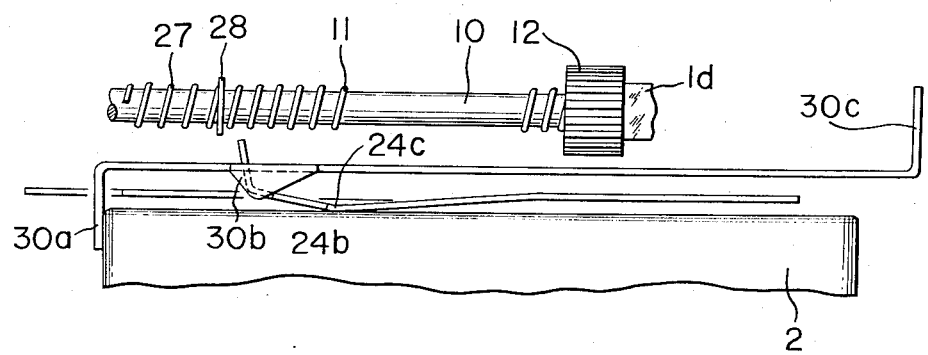
FIG. 12 is a fragmentary plan view of the FIG. 8 embodiment and showing the manner in which the engaging member is disengaged from the guide member when an operating lever is operated to remove the film cassette from the chamber.

Operations of various elements constituting the present embodiment will be described in connection with these figures. A resilient member 24 is provided with an engaging end portion 24a adapted to be projected for engagement with the guide member 11 upon engagement between a bent portion 24c and the cassette 2 when the cassette is inserted into the chamber 1h within the camera housing 1. The resilient member 24 has a tab portion adjacent the bent portion 24c. The lever 30 is formed with a slot 30d received on the shaft 1c, studded in the camera housing 1, so as to permit axial movement of the lever 30. The lever 30 is further provided with a projection 30a forming one end thereof and engageable with a wall of the chamber 1h, and an operating portion 30c forming the other end used to remove the cassette 2. The projection 30a acts to withdraw the cassette 2 from the chamber 1h by drawing out the operating portion 30c when the cassette is contained in the chamber 1h (FIG. 11). The lever 30 also has a driving portion 30b comprising an inclined projection adapted, when the operating portion 30c is drawn out, to engage the tab portion of the resilient member to force the engaging end portion 24a out of engagement with the guide member 111 to thereby return the pinion 12 to its start position (FIG. 12). It will be understood that the present embodiment is constructed so that the pinion 12 for indicating the amount of film consumed is returned to its start position in response to removal of the cassette 2 from the cassette containing chamber 1h, and this construction leads to more positive operation of the device than the previous embodiments.

We claim:

1. A film footage indicator device for a photographic camera having drive means for film, the improvement comprising:

a power source attached to the camera;
first power transmission means driven from said drive means;
second power transmission means drivingly engaged by said first power transmission means to receive rotary power therefrom, said second power transmission means having an indicator portion for indicating an amount of film consumption in accordance with the axial displacement thereof;
a guide member engageable by said second power transmission means for continuous rotation and axial movement therewith, and having a helical groove formed thereon;
resilient means provided with a resiliency for returning said guide member to its predetermined axial position;
engaging means engageable with said guide member upon insertion of a film cassette into a chamber therefor within the camera and disengageable therefrom upon removal of the cassette from said chamber; and
indicator means having scale means cooperable with at least a portion of said second power transmission means to indicate an amount of film consumption.

2. A film footage indicator device according to claim 1, wherein said first power transmission means has connected thereto drive means capable of controlling a photographic optical system by means of a shaft coupling.

3. A film footage indicator device according to claim 1, wherein said indicator means is indicated by an index member opposedly placed to said cooperable portion of said second power transmission means provided in said camera housing.

4. A film footage indicator device according to claim 1, wherein said first power transmission means comprises a shaft coupling, a skew gear and an elongated spur gear.

5. A film footage indicator device according to claim 1, wherein said second power transmission means includes a spur gear.

6. A film footage indicator device for a photographic camera having drive means for film, the improvement comprising:

a power source attached to the camera;
first power transmission means deceleratedly driven from said drive means;
second power transmission means receiving the rotary power from said first power transmission means, said second power transmission means having an indicator portion for indicating an amount of film consumption in accordance with the axial and rotary movement thereof;
a guide member engageable by said second power transmission means and having a helical thread-like groove;
resilient means normally biasing said guide member and said second power transmission means toward their start position for axial movement;
engaging means engageable with said guide member upon insertion of a film cassette into a chamber therefor and disengageable from said guide member upon removal of said cassette from said chamber; and scale means provided along the path of said indicator portion of said second power transmission means so as to cooperate with said indicator portion.

7. A film footage indicator device according to claim 6, wherein said first power transmission means has connected thereto drive means capable of controlling a photographic optical system by means of a shaft coupling.

8. A film footage indicator device according to claim 6, wherein said indicator portion comprises a scale disc having divisions formed circumferentially thereof.

9. A film footage indicator device according to claim 6, wherein said first power transmission means comprises a shaft coupling, a skew gear and an elongated spur gear.

10. A film footage indicator device according to claim 6, wherein said second power transmission means includes a spur gear.

11. A film footage indicator device for a photographic camera having drive means for driving a film, comprising:

drive means for advancing the film;
first drive means drivingly connected to said drive means;
second drive means connected to and deceleratedly driven from said first drive means, said second drive means having a rotary member and a coiled resilient member for biasing said rotary member to its predetermined start position, said resilient member being connected to said rotary member for rotation therewith;
engaging means engageable with the coiled groove of said resilient member upon insertion of a film cassette into a chamber therefor and disengageable from said groove upon removal of said cassette from said chamber; and
scale means cooperable with at least a portion of said rotary member and provided along the path of said portion.

* * * * *